United States Patent [19]
Hirst, Jr.

[11] 3,897,694
[45] Aug. 5, 1975

[54] PARKING BRAKE OPERATING MEANS INCLUDING A STATIONARY CAM

[76] Inventor: Charles M. Hirst, Jr., 1728 Lakewood, Moberly, Mo.

[22] Filed: Sept. 19, 1973

[21] Appl. No.: 398,592

[52] U.S. Cl. .................................. 74/516; 74/518
[51] Int. Cl.² ........................................ B26D 9/00
[58] Field of Search ............ 74/512, 516, 517, 518, 74/560

[56] References Cited
UNITED STATES PATENTS

| | | | |
|---|---|---|---|
| 2,977,817 | 4/1961 | Panasewicz | 74/516 |
| 3,625,087 | 12/1971 | Flory et al. | 74/518 |

*Primary Examiner*—Samuel Scott
*Assistant Examiner*—Frank H. McKenzie, Jr.

[57] ABSTRACT

An improved parking brake cable operating means including a stationary cam that is secured to the housing of the parking brake lever assembly, said cam having a plurality of cam surfaces. The foot-operated lever is connected for pivotal movement relative to the housing by means of a plurality of roller follower members thereon that continuously engage both cam surfaces, respectively, said cam surfaces having such a configuration and said roller followers being so arranged that during the initial movement of the parking brake lever in the brake-engaged direction, relatively fast cable take-up with low mechanical advantage is effected, while during the final movement of the parking brake lever, relatively slow cable take-up with high mechanical advantage is achieved.

5 Claims, 10 Drawing Figures

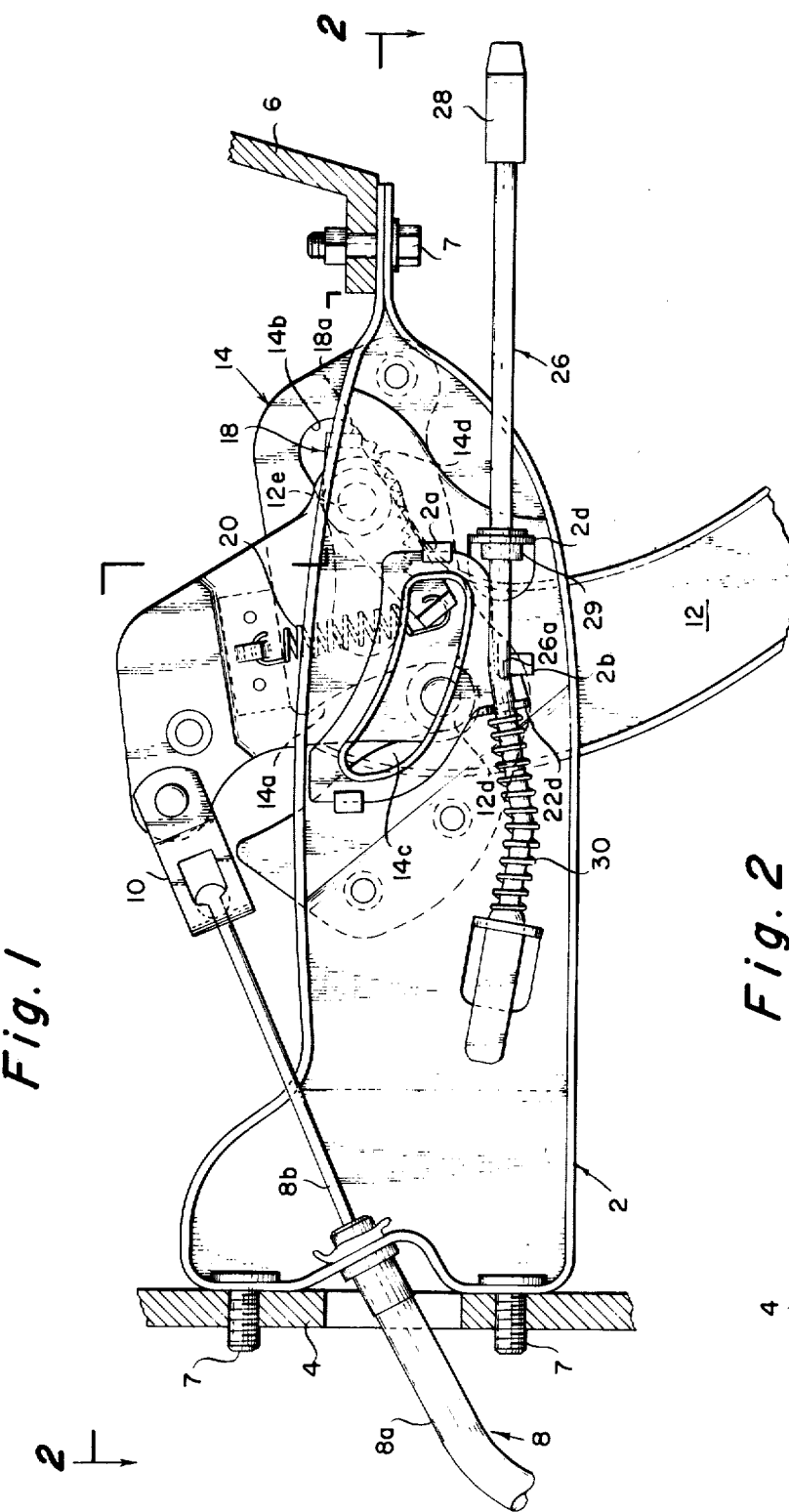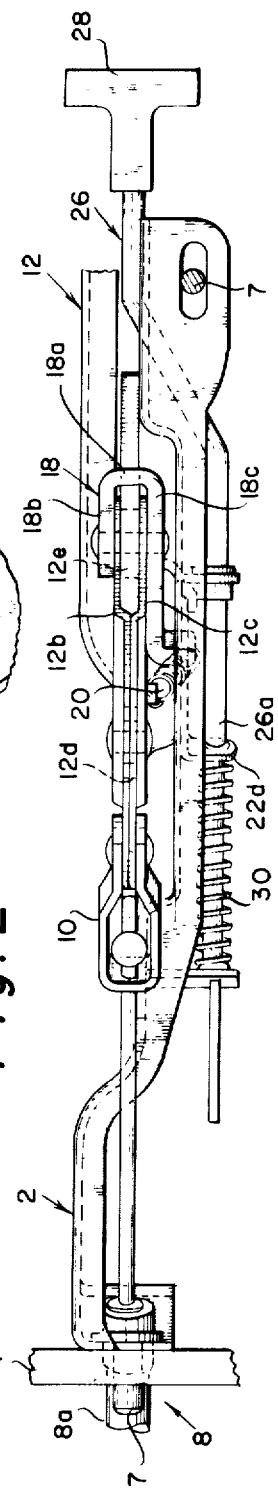

PARKING BRAKE OPERATING MEANS INCLUDING A STATIONARY CAM

This invention relates generally to parking brake operating means for operating a parking brake between engaged and disengaged conditions.

In the prior Hirst U.S. Pat. No. 3,693,472, a parking brake operating means is disclosed in which a pivotable cam member is provided for initially effecting fast take-up of the brake cable with relatively low mechanical advantage, and to subsequently effect slow cable take-up with high mechanical advantage. While this prior brake cable operating means has been found to perform satisfactorily, it requires a rather large number of complex components and thereby is relatively expensive to manufacture and assemble. Furthermore, owing to the fact that the cam member is connected for pivotal movement relative to the housing, it is important that accurate guidance of the cam and follower means be maintained throughout the operation of the apparatus. The present invention was developed to avoid the above and other drawbacks of the known devices and to provide an improved positive-acting parking brake operating means that is of inexpensive, durable and simple construction.

Accordingly, a primary object of the present invention is to provide an improved parking brake operating means that includes a stationary cam member which is secured to the parking brake housing, said cam member including a plurality of cam surfaces at least one of which has an irregular configuration. The parking brake lever is pivotally connected with the housing by a pair of roller followers thereon that engage the cam surfaces, said cam surfaces having such a configuration and said roller followers being so arranged that initial movement of the parking brake lever from the disengaged position toward the fully engaged position produces relatively fast cable take-up with low mechanical advantage, while during final movement of the lever, there is produced relatively slow cable take-up with high mechanical advantage.

In accordance with a more specific object of the invention, one of the cam surfaces on the member is defined by one wall of a slot contained in the cam member. In order to lock the lever in the brake-engaged position, pawl and ratchet means are provided. According to a characterizing feature of the invention, the ratchet teeth are defined on a wall portion of the aforementioned cam slot, the pawl being pivotally connected with the lever and including a ratchet-engaging portion that extends at least partially through the cam slot. Pawl release means are provided for releasing the pawl from the ratchet teeth, thereby permitting the lever to be returned by the brake cable tension to the brake-released position.

Other objects and advantages of the invention will become apparent from a study of the following specification when viewed in the light of the accompanying drawing, in which:

FIG. 1 is a partially broken away side elevational view of the parking brake cable operating means when in the brake-released condition;

FIG. 2 is a sectional view taken along the line 2—2 of FIG. 1;

Figure 3:
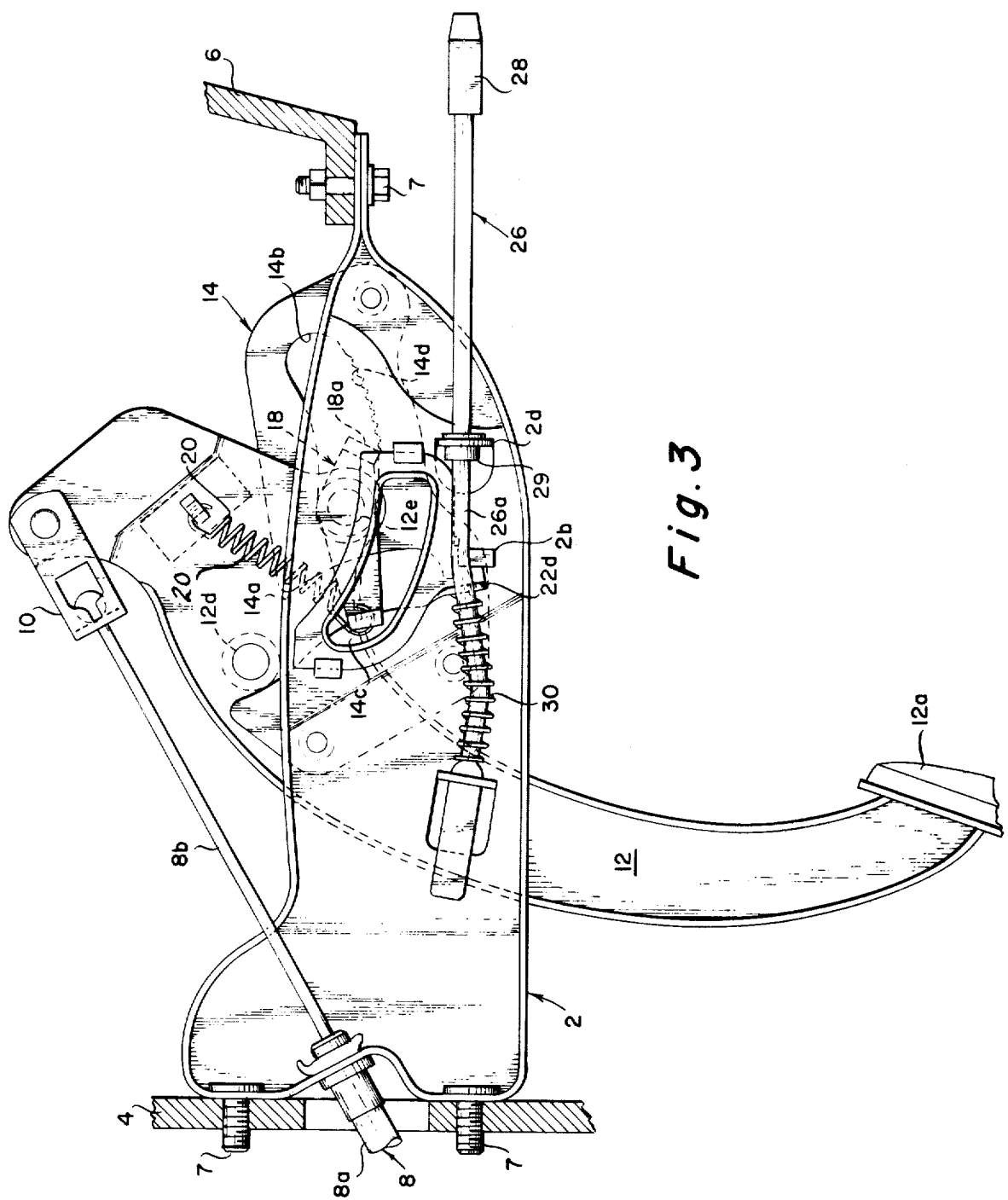
FIG. 3 is a side elevational view corresponding to FIG. 1 with the parking brake cable operating means in the brake-engaged condition.

Referring first more particularly to FIGS. 1 and 2, the brake cable operating means includes a rigid metal housing 2 adapted for rigid connection at one end with the vehicle chassis 4 and at the other end with the vehicle dashboard 6 by means of bolts 7. The first end of the housing contains an opening for receiving the stationary outer coaxial sleeve 8a of the parking brake cable assembly 8. The axially movable inner parking brake cable 8b is connected with a clevis 10 for pivotal connection with one end of the parking brake lever 12. The other end of the lever 12 carries a foot pedal 12a.

In accordance with the present invention, improved means are provided for pivotally connecting the intermediate portion of the parking brake lever with the housing in such a manner that during initial pivotal movement of the lever in the brake-engaged direction, the lever effects relatively fast cable take-up with low mechanical advantage, and during final pivotal movement of the lever, the lever effects relatively slow cable take-up with high mechanical advantage. To this end, there is rigidly connected with the housing 2 a cam plate 14 (FIGS. 9 and 10) which contains a groove 14a defining an irregular first cam surface, said cam member containing a cam opening 14b at least one wall portion of which defines a second cam surface. The upper end of the lever 12 includes a pair of spaced plate portions 12b, 12c between which are mounted a first cam follower roller 12d for engagement with the cam surface of groove 14a, and a second cam follower roller 12e that extends through the cam opening 14b. Consequently, as brake applying pressure is applied to the foot pedal portion 12a to pivot the lever in the clockwise direction toward the brake-engaged condition of FIG. 3, the cam follower rollers 12d and 12e engage the cam surfaces of cam groove 14a and cam opening 14b of cam member 14, and owing to the bulge portion 14c defined on one wall of cam groove 14a, the parking brake cable 8b is subjected to the desired initial fast take-up with low mechanical advantage, and to subsequent slow take-up with high mechanical advantage.

Figure 8:
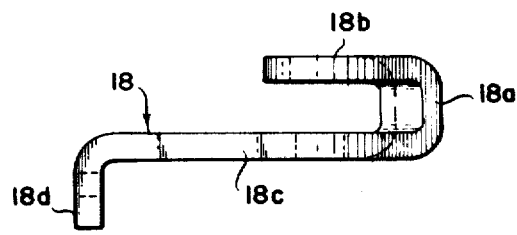
Figure 9:
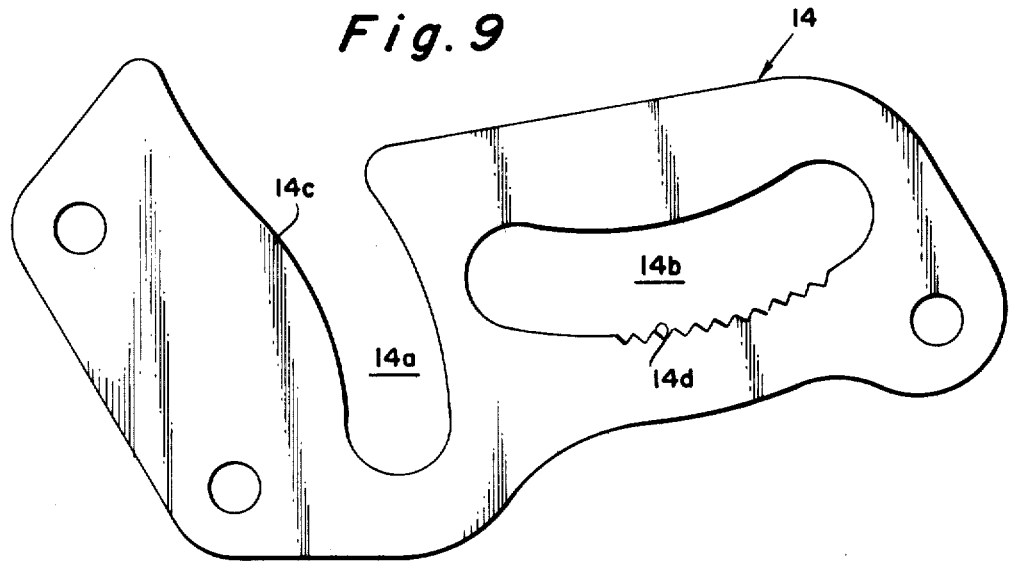
FIGS. 9 and 10 are side elevation and top plan views of the cam member.
Figure 10:
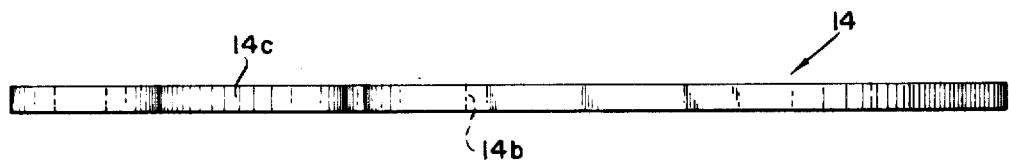

In accordance with another feature of the invention, pawl and ratchet means are provided for releasably locking the parking brake lever in the brake-engaged condition. As shown in FIGS. 1 and 9, the ratchet teeth 14d are formed on the bottom wall portion of the opening 14b contained in the cam member 14. The pawl member 18 is of generally U-shaped configuration and includes a ratchet-engaging transverse portion 18a (FIGS. 2 and 8) that extends through cam slot 14b, and a pair of arm portions 18b, 18c that are pivotally connected with the shaft of the cam follower roller 12e. Arm portion 18c is extended and carries the transversely extending pawl release projection 18d that extends through a slot contained in the housing 2. Spring 20 is connected at opposite ends with a tab formed in the upper portion of lever 12 and with the pawl 18, respectively, to pivotally bias the pawl in the clockwise direction into engagement with the ratchet teeth 14d.

Figure 4:
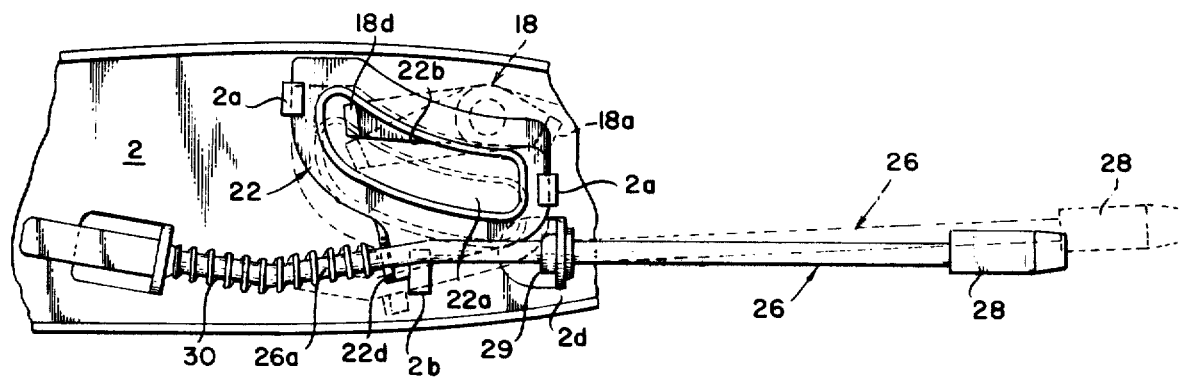
FIG. 4 is a detailed side elevational view of the pawl release bracket assembly.
Figure 5:
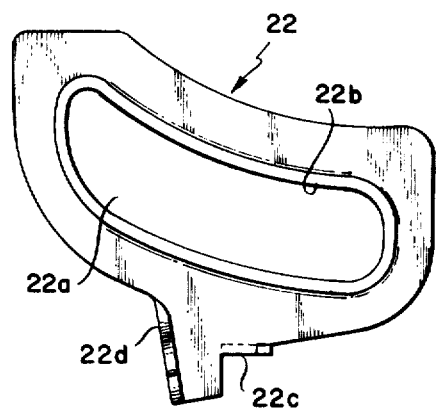
FIGS. 5 and 6 are side elevation and end views of the pawl release bracket.
Figure 6:
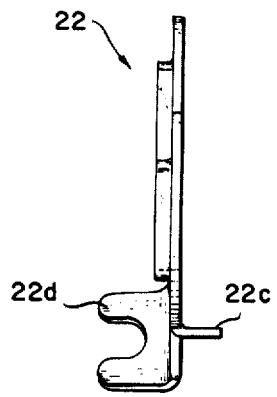
Figure 7:
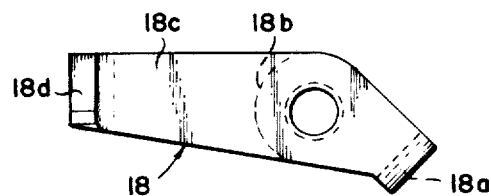
FIGS. 7 and 8 are side elevation and top plan view of the pawl.

Referring now to FIG. 4, slidably connected with housing 2 for vertical movement between the spaced guides 2a is a pawl release bracket 22 which contains a cam slot 22a that receives the pawl lateral projection 18d. Owing to the spring bias applied to the pawl 18, the lateral projection 18d engages the cam surface 22b defined by the upper wall of slot 22a to normally maintain the bracket in the illustrated elevated position. As shown in FIG. 6, the release bracket includes one lateral projection 22c that extends through a corresponding vertical slot 2b contained in the housing 2, and a bifurcated second lateral projection 22d that extends in the opposite direction for receiving the angled intermediate portion 26a of the release rod 26 that is guided for axial displacement by the bushing 29 carried by the laterally bent tongue portion 2d of housing 2. Release rod 26, which is provided at its free end with release handle 28, is normally biased to the left toward a retracted condition by coaxially arranged spring 30. Consequently, when release rod 26 is displaced to the right by the application of a pulling force to handle 28, the angled portion 26a of the release rod 26 cooperates with the bracket bifurcated portion 22d to displace bracket 22 downwardly, thereby pivoting pawl 18 in the counterclockwise direction to lift the transverse pawl portion 18a from the pawl teeth 14d.

Operation

To engage the parking brake when in the disengaged condition of FIG. 1, force is applied to the foot pedal 12a to pivot lever 12 in the clockwise direction, whereby rollers 12d and 12e cooperate with the cam surfaces of groove 14a and opening 14b, respectively, to initially effect fast cable take-up with low mechanical advantage and to subsequently effect slow cable take-up with high mechanical advantage. Pawl transverse portion 18a engages ratchet teeth 14d to lock the pedal 12 in the given brake-engaged position.

To release the parking brake, handle 28 is pulled to displace release lever 26 to the right, whereupon release bracket 22 is displaced downwardly to pivot the pawl in the counterclockwise direction, thereby disengaging the pawl transverse portion 18a from the ratchet teeth 14d. Owing to the tension of brake cable 8b, lever 12 is pivoted in the counter-clockwise direction toward the brake-released condition of FIG. 1.

While in accordance with the provisions of the Patent Statutes the preferred form and embodiment of the invention has been illustrated and described, it is obvious that various changes may be made without deviating from the inventive concepts.

What is claimed is:

1. Brake cable operating means for axially displacing a vehicle parking brake cable from a brake-released position toward a brake-engaged position, comprising
   a. a housing adapted for rigid connection with a vehicle body for axially receiving the free end of said brake cable;
   b. a foot-operated parking brake lever adapted for connection with the free end of said brake cable;
   c. means connecting said lever for pivotal coplanar movement relative to said housing, said connecting means including
      1. a cam member rigidly connected in parallel relation with said housing, said cam member including an opening one wall of which defines a first cam surface, said cam member including a wall portion defining a second cam surface;
      2. a pair of cam follower members connected with said lever for continuous camming engagement with both said cam surfaces, respectively, said cam surfaces having such a configuration and said cam follower members being so arranged that during the initial pivotal movement of said lever relative to said housing from a brake-released position toward a brake-engaged position, the lever effects relatively fast cable take-up with low mechanical advantage, and during final pivotal movement of the lever, the lever effects relatively slow cable take-up with high mechanical advantage;
   d. pawl and ratchet means for locking said lever in the brake-engaged position, said pawl and ratchet means including a ratchet formed on one wall of said cam opening; and
   e. brake release means for releasing said lever locking means.

2. Apparatus as defined in claim 1, wherein said pawl and ratchet means includes a pawl pivotally connected with said lever, said pawl including a ratchet-engaging portion that extends through said slot for engagement with said ratchet.

3. Apparatus as defined in claim 2, wherein said pawl is of a generally U-shaped configuration including a pair of arm portions arranged parallel with and on opposite sides of said cam member, said arm portions being connected at one end with said ratchet-engaging portion, the other end of said arms being pivotally connected with said lever about an axis coaxial with that of said first roller.

4. Apparatus as defined in claim 3, and further including spring means pivotally biasing said pawl in the ratchet engaging direction.

5. Apparatus as defined in claim 4, wherein one arm of said pawl has an axial extension the free end of which carries a lateral release projection that extends through an opening contained in the housing;

and further wherein said means for releasing said lever locking means comprises a release bracket connected for parallel sliding movement with said housing opposite said opening, said release bracket containing a second cam slot for receiving said pawl release projection, and parking brake release lever means slidably connected with said housing for slidably displacing said release bracket in a direction to cause said second cam slot to engage said release projection and to pivot the pawl in the pawl-releasing direction, whereby the parking brake lever is released for return to the brake-released position.

* * * * *